United States Patent
Gholmieh et al.

(10) Patent No.: US 8,599,771 B2
(45) Date of Patent: Dec. 3, 2013

(54) CONTROL OF RADIO LINKS IN A MULTIPLE CARRIER SYSTEM

(75) Inventors: Aziz Gholmieh, San Diego, CA (US); Danlu Zhang, San Diego, CA (US); Sharad Deepak Sambhwani, San Diego, CA (US); Rohit Kapoor, San Diego, CA (US); Jilei Hou, San Diego, CA (US); Bibhu Prasad Mohanty, San Diego, CA (US); Ozcan Ozturk, San Diego, CA (US); Arjun Bharadwaj, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 12/759,369

(22) Filed: Apr. 13, 2010

(65) Prior Publication Data

US 2010/0271939 A1  Oct. 28, 2010

Related U.S. Application Data

(60) Provisional application No. 61/169,310, filed on Apr. 15, 2009.

(51) Int. Cl.
*H04W 4/00* (2009.01)
(52) U.S. Cl.
USPC ............................................ 370/329; 370/228
(58) Field of Classification Search
USPC ..................................... 370/228, 329, 331, 338
See application file for complete search history.

(56) References Cited

U.S. PATENT DOCUMENTS

| | | | | |
|---|---|---|---|---|
| 2010/0020852 A1* | 1/2010 | Erell et al. | | 375/141 |
| 2010/0227569 A1* | 9/2010 | Bala et al. | | 455/73 |
| 2010/0322191 A1* | 12/2010 | Lefebvre | | 370/331 |
| 2011/0274099 A1* | 11/2011 | Kwon et al. | | 370/338 |

FOREIGN PATENT DOCUMENTS

KR   20090007481 A   1/2009

OTHER PUBLICATIONS

3rd Generation Partnership Project; Technical Specification Group Radio Access Network; Radio Resource Control (RRC); Protocol Specification (Release 7) Mar. 1, 2009, 3GPP Standard; 3GPP TS 25.331, 3rd Generation Partnership Project (3GPP), Mobile Competence Centre; 650, Route Des Lucioles; F-06921 Sophia-Antipolis Cedex; France, pp. 1-1433 , XP050368015, chapter 8.5.4 Physical channel establishment criteria, chapter 8.5.6 Radio link failure criteria and actions upon radio link failure, chapter 8.6.6.30 SRB delay, PC preamble (FDD only).

Ericsson: "Design considerations for DC-HSUPA operation" 3GPP Draft; R1-091315 DC-HSUPA, 3rd Generation Partnership Project (JGPP), Mobile Competence Centre ; 650, Route Des Lucioles ; F-06921 Sophia-Antipolis Cedex ; France, No. Seoul, Korea; 20090318, Mar. 18, 2009, XP050338915.

(Continued)

*Primary Examiner* — Albert T Chou
(74) *Attorney, Agent, or Firm* — Darren M. Simon

(57) ABSTRACT

Methods, systems and apparatuses for controlling radio links in a multiple carrier wireless communication system are disclosed. A method can include aggregating control functions from at least two carriers onto one carrier to form an anchor carrier and one or more associated secondary carriers; establishing communication links for the anchor carrier and each secondary carrier; and controlling communication based on the anchor carrier.

23 Claims, 10 Drawing Sheets

(56) References Cited

OTHER PUBLICATIONS

Huawei: "RLF consideration i n DC-HSDPA" 3GPP Draft; R2-086693 RLF Consideration I N DC-HSDPA, 3rd Generation Partnership Project (SGPP), Mobile Competence Centre ; 650, Route Des Lucioles ; F-06921 Sophia-Antipolis Cedex ; France, No. Prague, Czech Republic; 20081104, Nov. 4, 2008, XP050321562.
International Search Report and Written Opinion—PCT/US2010/031166 , International Search Authority—European Patent Office—Jul. 2, 2010.
3rd Generation Partnership Project; Technical Specification Group Radio Access Network, Radio Resource Control (RRC); Protocol Specification (Release 8), 3GPP TS 25.331 V8.6.0, Mar. 2009, p. 292-295.
Taiwan Search Report—TW099111841—TIPO—May 25, 2013.
Universal Mobile Telecommunications System (UMTS); Radio Resource Control (RRC); Protocol Specification (3GPP TS 25.331 version 7.7.0 Release 7); ETSI TS 125 331 ETSI Standards, Lis Sophia Antipolis Cedex, France, vol. 3-R2, no. v7.7.0, Jan. 1, 2008 XP014040640, paragraphs [8.1.1.1; 8.1.1.7; 8.7.1; 8.7.3].

* cited by examiner

CONTROL OF RADIO LINKS IN A MULTIPLE CARRIER SYSTEM

CLAIM OF PRIORITY UNDER 35 U.S.C. §119

The present application for patent claims priority to Provisional Application No. 61/169,310 entitled "METHODS TO CONTROL RADIO LINKS IN A MULTIPLE CARRIER SYSTEM" filed Apr. 15, 2009, and assigned to the assignee hereof and hereby expressly incorporated by reference herein.

FIELD OF DISCLOSURE

The present application pertains to wireless communication, and more specifically, to techniques for controlling radio links in a multiple carrier wireless communication system.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. Such systems can conform to standards such as Third-Generation Partnership Project 2 (3gpp2, or "cdma2000"), Third-Generation Partnership (3gpp, or "W-CDMA"), or Long Term Evolution (LTE). In the design of such communications systems, it is desirable to maximize the capacity, or the number of users the system can reliably support, given the available resources.

The apparatuses and methods of the present patent application are directed to overcoming limitations of the prior art and providing improved radio link control for multiple carrier wireless communication systems.

SUMMARY

The described features generally relate to one or more improved systems, methods and/or apparatuses for improved uplink transmit diversity.

One embodiment is directed to a method for controlling radio links in a multiple carrier wireless communication system. The method comprising: aggregating control functions from at least two carriers onto one carrier to form an anchor carrier and one or more associated secondary carriers; establishing communication links for the anchor carrier and each secondary carrier; and controlling communication based on the anchor carrier.

Another embodiment is directed to an apparatus for controlling radio links in a multiple carrier wireless communication system. The apparatus comprises: a processor, memory in electronic communication with the processor programmed with instructions to aggregate control functions from at least two carriers onto one carrier to form an anchor carrier and one or more associated secondary carriers; instructions to establish communication links for the anchor carrier and each secondary carrier; and instructions to control communication based on the anchor carrier.

Another embodiment is directed to an apparatus for controlling radio links in a multiple carrier wireless communication system. The apparatus comprises: means for aggregating control functions from at least two carriers onto one carrier to form an anchor carrier and one or more associated secondary carriers; means for establishing communication links for the anchor carrier and each secondary carrier; and means for controlling communication based on the anchor carrier.

Another embodiment is directed to a computer program product for controlling radio links in a multiple carrier wireless communication system comprising computer-readable storage medium which comprises code for causing a computer to aggregate control functions from at least two carriers onto one carrier to form an anchor carrier and one or more associated secondary carriers; code for causing a computer to establish communication links for the anchor carrier and each secondary carrier; and code for causing a computer to control communication based on the anchor carrier.

Further scope of the applicability of the described methods and apparatuses will become apparent from the following detailed description, claims, and drawings. The detailed description and specific examples, while indicating preferred examples of the disclosure and claims, are given by way of illustration only, since various changes and modifications within the spirit and scope of the description will become apparent to those skilled in the art.

BRIEF DESCRIPTION OF THE DRAWINGS

The features, objects, and advantages of the disclosed methods and apparatus will become more apparent from the detailed description set forth below when taken in conjunction with the drawings in which like reference characters identify correspondingly throughout and wherein.

DETAILED DESCRIPTION

The detailed description set forth below in connection with the appended drawings describes exemplary examples and does not represent the only examples that may be implemented or are within the scope of the claims. The term "exemplary" used throughout this description means "serving as an example, instance, or illustration," and should not necessarily be construed as preferred or advantageous over other examples. The detailed description includes specific details for the purpose of providing a thorough understanding of the described methods and apparatuses. However, it will be apparent to those skilled in the art that the methods and apparatuses may be practiced without these specific details.

In some instances, well-known structures and devices are shown in block diagram form in order to avoid obscuring the concepts of the described methods and apparatuses.

Multi-Carrier Systems

Further described herein with reference to FIGS. 1-4 is an example of a radio network operating according to Universal Mobile Telecommunications System (UMTS) in which the principles of the disclosure may be applied. Node Bs 110, 111, 114 and radio network controllers 141-144 are parts of a network called a "radio network," "RN," "access network (AN)." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit switched and IP-based packet-switched traffic types. The UTRAN provides an air interface access method for the user equipment (UE) 123-127. Connectivity is provided between the UE (user equipment) and the core network by the UTRAN. The radio network may transport data packets between multiple user equipment devices 123-127.

Figure 1:
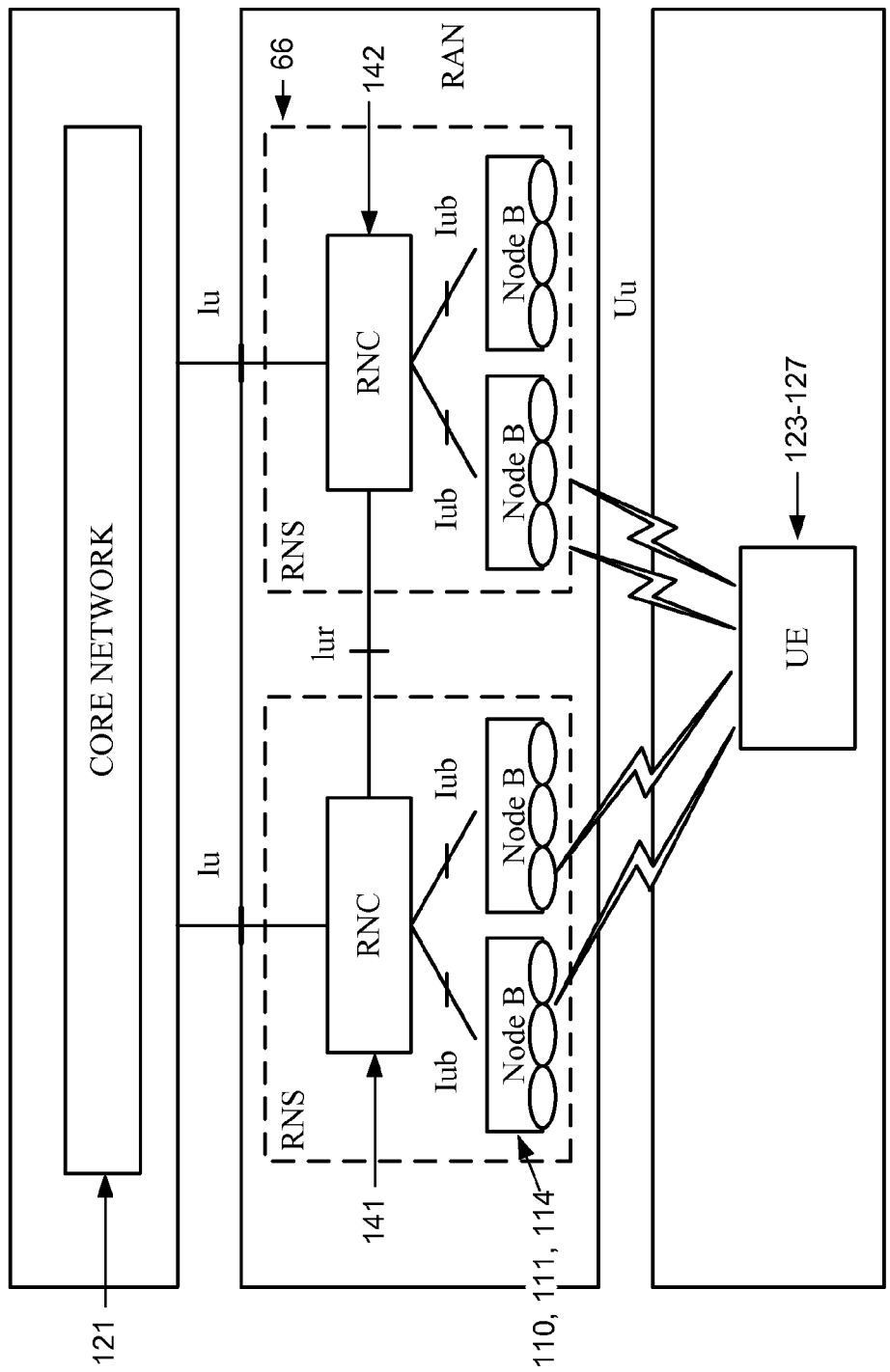
FIG. 1 is a block diagram of a radio access system having two radio network subsystems along with its interfaces to the core and the user equipment.

The UTRAN is connected internally or externally to other functional entities by four interfaces: Iu, Uu, Iub and Iur. The UTRAN is attached to a GSM core network 121 via an external interface called Iu. Radio network controller (RNC) 141-144 (shown in FIG. 2), of which 141, 142 are shown in FIG. 1, supports this interface. In addition, the RNCs 141-144 manage a set of base stations called Node Bs through interfaces labeled Iub. The Iur interface connects the two RNCs 141-142 with each other. The UTRAN is largely autonomous from the core network 121 since the RNCs 141-144 are interconnected by the Iur interface. FIG. 1 discloses a communication system which uses the RNC, the Node Bs and the Iu and Uu interfaces. The Uu is also external and connects the Node Bs 110, 111, 114 with the UE 123-127, while the Iub is an internal interface connecting the RNC 142-144 with the Node Bs 110, 111, 114.

The radio network may be further connected to additional networks outside the radio network, such as a corporate intranet, the Internet, or a conventional public switched telephone network as stated above, and may transport data packets between each user equipment device 123-127 and such outside networks.

Figure 2:
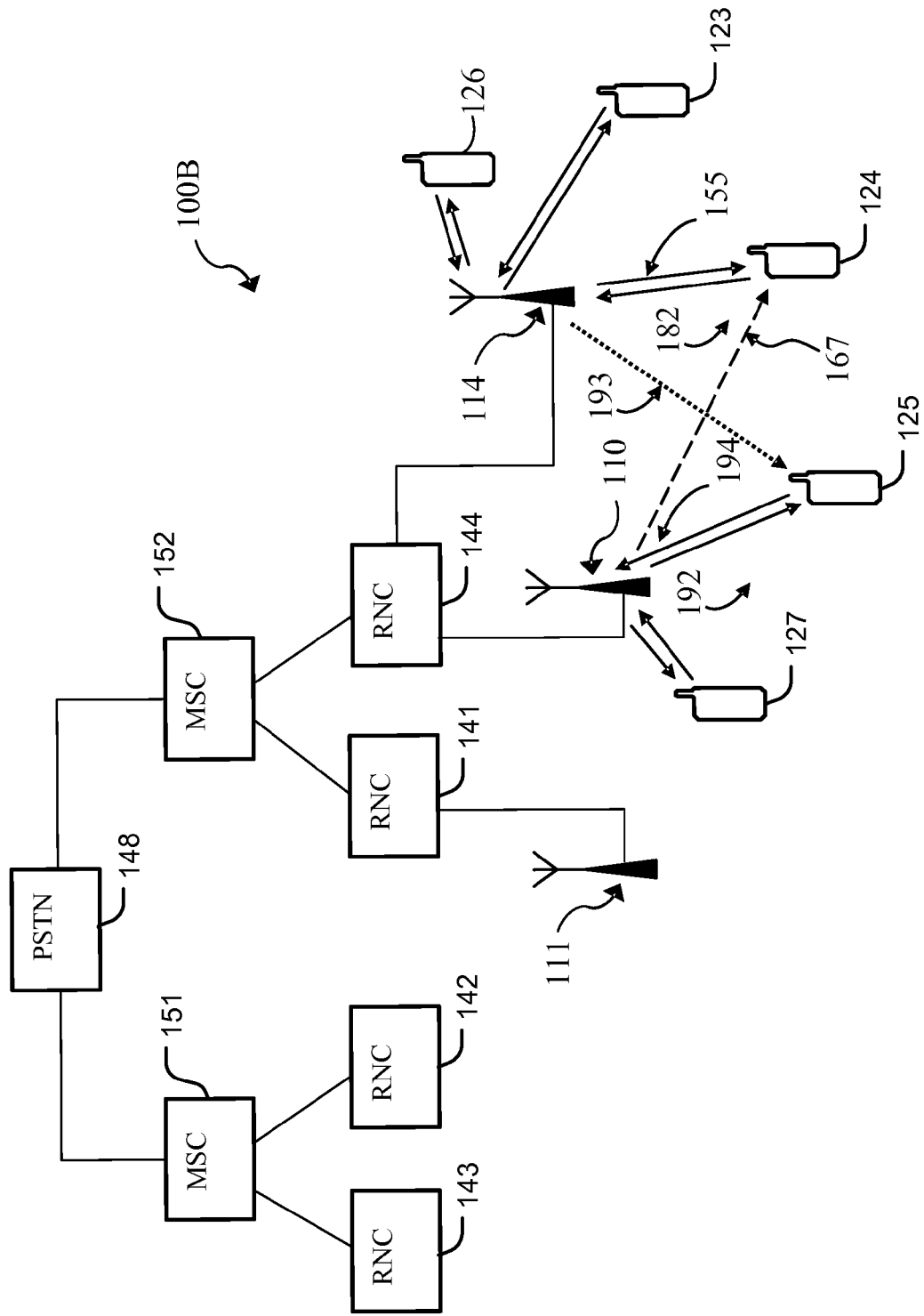
FIG. 2 is a simplified representation of a cellular communications system.

FIG. 2 illustrates selected components of a communication network 100, which includes radio network controller (RNC) (or base station controllers (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. A communications channel includes a forward link (FL) (also known as a downlink) for transmissions from the Node B 110, 111, 114 to the user equipment (UE) 123-127, and a reverse link (RL) (also known as an uplink) for transmissions from the UE 123-127 to the Node B 110, 111, 114. The RNCs 141-144 provides control functionalities for one or more Node Bs. The radio network controllers 141-144 are coupled to a public switched telephone network (PSTN) 148 through mobile switching centers (MSC) 151, 152. In another example, the radio network controllers 141-144 are coupled to a packet switched network (PSN) (not shown) through a packet data server node (PDSN) (not shown). Data interchange between various network elements, such as the radio network controllers 141-144 and a packet data server node, can be implemented using any number of protocols, for example, the Internet Protocol (IP), an asynchronous transfer mode (ATM) protocol, T1, E1, frame relay, or other protocols.

Each RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. The RNC is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

W-CDMA

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate Inherent in the design of direct sequence CDMA systems is a receiver that aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems uses synchronization channels and a cell searching technique.

HSPA

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses three enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI.

MIMO

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone. The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. The communication link through which the user equipment 123-127 sends signals to the Node B 110, 111, 114 is called an uplink. The communication link through which Node B 110, 111, 114 sends signals to a user equipment 123-127 is called a downlink.

Figure 3:
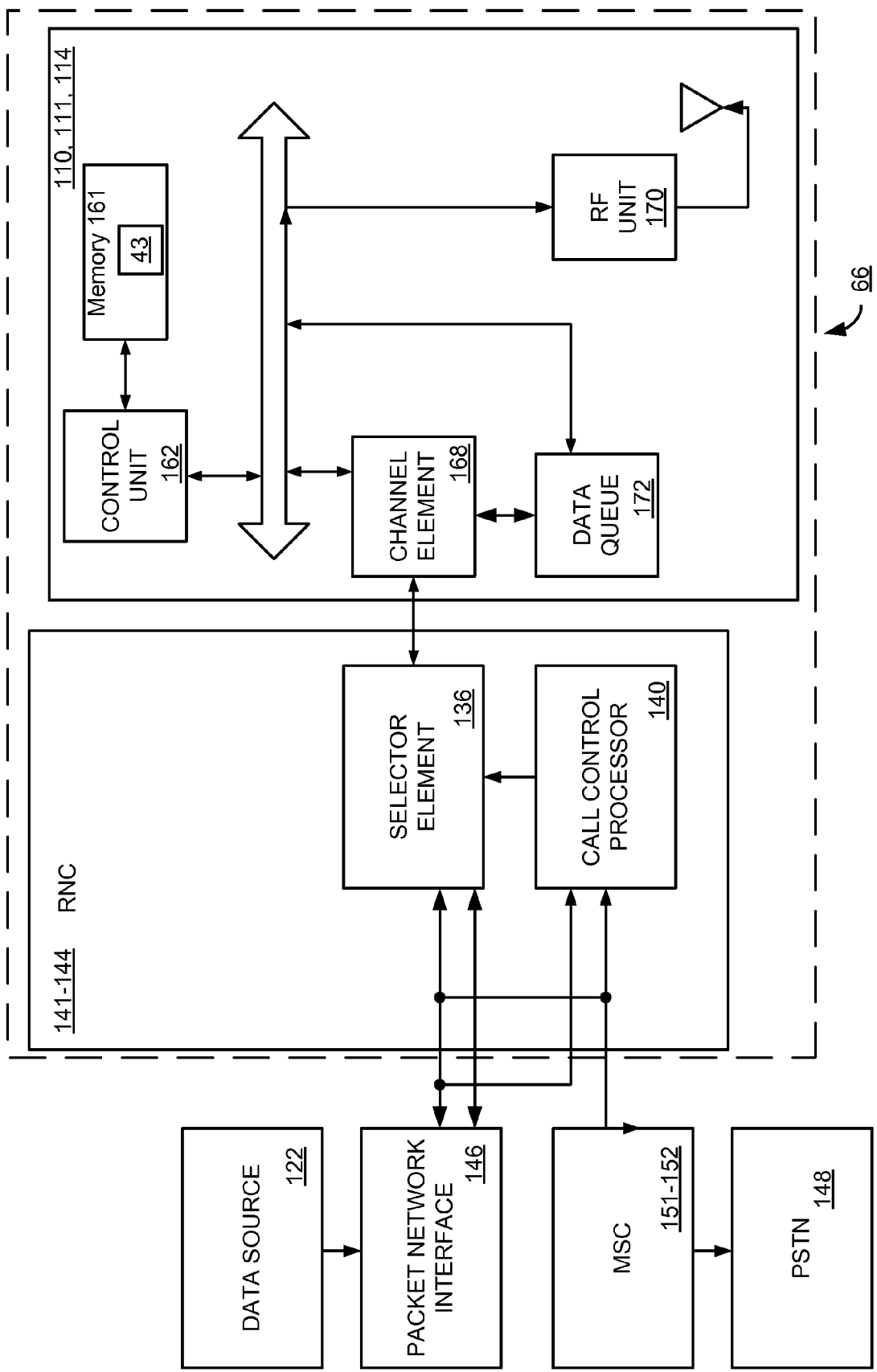
FIG. 3 is detailed herein below, wherein specifically, a Node B and radio network controller interface with a packet network interface; is a portion of a communication system, including a radio network controller and a Node B.

FIG. 3 is detailed herein below, wherein specifically, a Node B 110, 111, 114 and radio network controllers 141-144 interface with a packet network interface 146. (Note in FIG. 3, only one of the Nodes B 110, 111, 114 and only one of the RNCs 141-144 is shown for simplicity). The Node B 110, 111, 114 and radio network controller 141-144 may be part of a radio network server (RNS) 66, shown in FIG. 1 and in FIG. 3 as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 associated with the data queue 172.

The radio network controller 141-144 interfaces with the Public Switched Telephone Network (PSTN) 148 through a mobile switching center 151, 152. Also, radio network controller 141-144 interfaces with Node Bs 110, 111, 114 in the communication system 100 (only one Node B 110, 111, 114 is shown in FIG. 2 for simplicity). In addition, the radio network controller 141-144 interfaces with a Packet Network Interface 146. The radio network controller 141-144 coordinates the communication between the user equipment 123-127 in the communication system and other users connected to packet network interface 146 and PSTN 148. The PSTN 148 interfaces with users through a standard telephone network (not shown in FIG. 3).

The radio network controller 141-144 contains many selector elements 136, although only one is shown in FIG. 3 for simplicity. Each selector element 136 is assigned to control communication between one or more Node B's 110, 111, 114 and one remote station 123-127 (not shown). If the selector element 136 has not been assigned to a given user equipment 123-127, a call control processor 140 is informed of the desire to page the user equipment 123-127. The call control processor 140 then directs the Node B 110, 111, 114 to page the user equipment 123-127.

Data source 122 contains a quantity of data, which is to be transmitted to a given user equipment 123-127. The data source 122 provides the data to the packet network interface 146. The packet network interface 146 receives the data and routes the data to the selector element 136. The selector element 136 then transmits the data to the Node B 110, 111, 114 in communication with the target user equipment 123-

127. In one example, each Node B 110, 111, 114 maintains a data queue 172 which stores the data to be transmitted to the user equipment 123-127.

For each data packet, a channel element 168 inserts the necessary control fields. In one example, the channel element 168 performs a cyclic redundancy check, CRC, encoding of the data packet and control fields and inserts a set of code tail bits. The data packet, control fields, CRC parity bits, and code tail bits comprise a formatted packet. The channel element 168 then encodes the formatted packet and interleaves (or reorders) the symbols within the encoded packet. The interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 110, 111, 114, specifically the de-interleaving, decoding, and CRC check functions. The decoded data is provided to a data sink.

Figure 4:
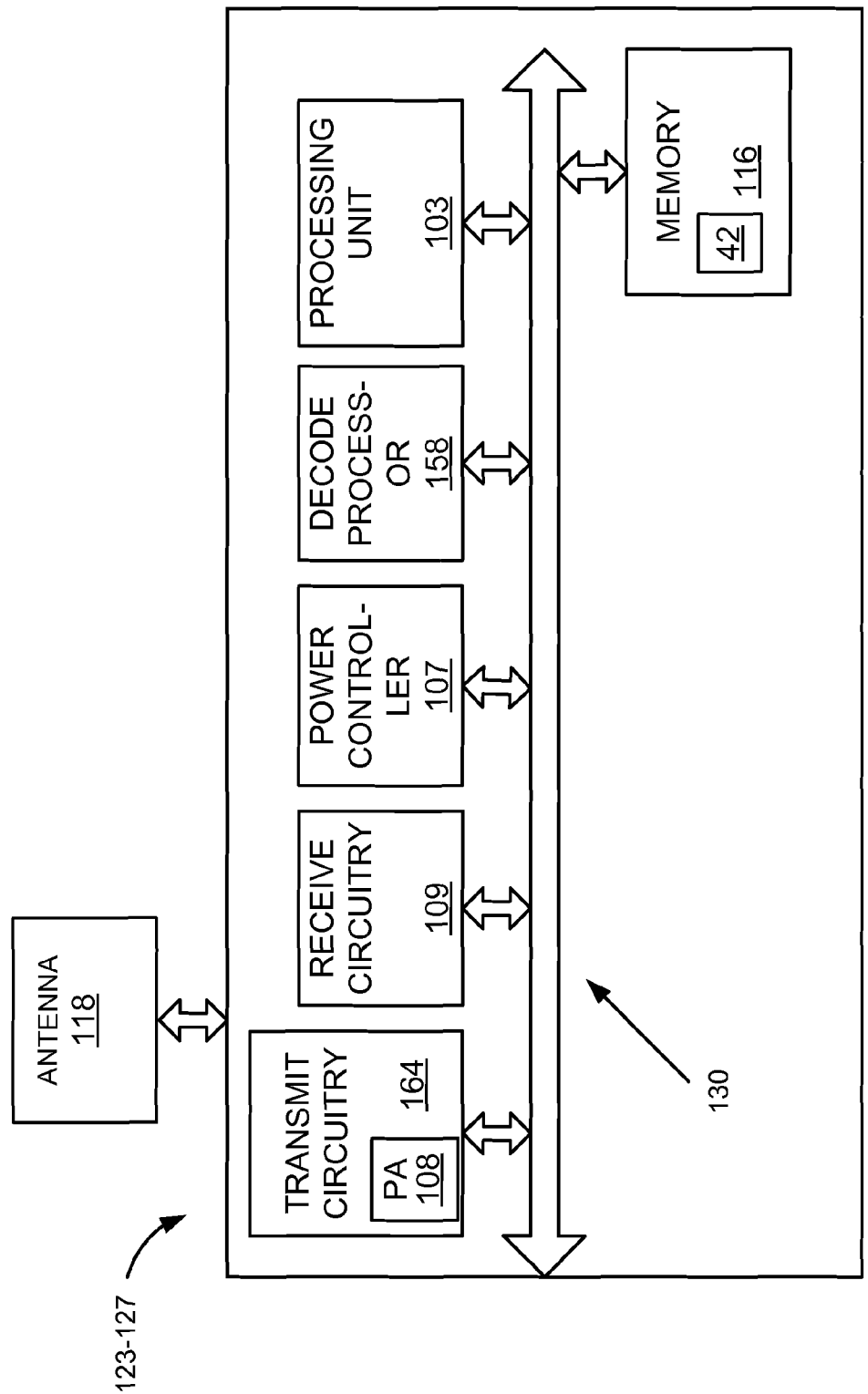
FIG. 4 is a block diagram of user equipment (UE)

FIG. 4 illustrates an example of a user equipment (UE) 123-127 in which the UE 123-127 includes transmit circuitry 164 (including PA 108), receive circuitry 109, power controller 107, decode processor 158, a processing unit 103 for use in processing signals, and memory 116. The transmit circuitry 164 and the receive circuitry 109 may allow transmission and reception of data, such as audio communications, between the UE 123-127 and a remote location. The transmit circuitry 164 and receive circuitry 109 may be coupled to an antenna 118.

The processing unit 103 controls operation of the UE 123-127. The processing unit 103 may also be referred to as a CPU. Memory 416, which may include both read-only memory (ROM) and random access memory (RAM), provides instructions and data to the processing unit 103. A portion of the memory 116 may also include non-volatile random access memory (NVRAM).

The various components of the UE 123-127 are coupled together by a bus system 130 which may include a power bus, a control signal bus, and a status signal bus in addition to a data bus. For the sake of clarity, the various busses are illustrated in FIG. 4 as the bus system 130.

The steps of the methods discussed may also be stored as instructions in the form of software or firmware 43 located in memory 161 in the Node B 110, 111, 114, as shown in FIG. 3. These instructions may be executed by the control unit 162 of the Node B 110, 111, 114 in FIG. 3. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 4.

Figure 5:
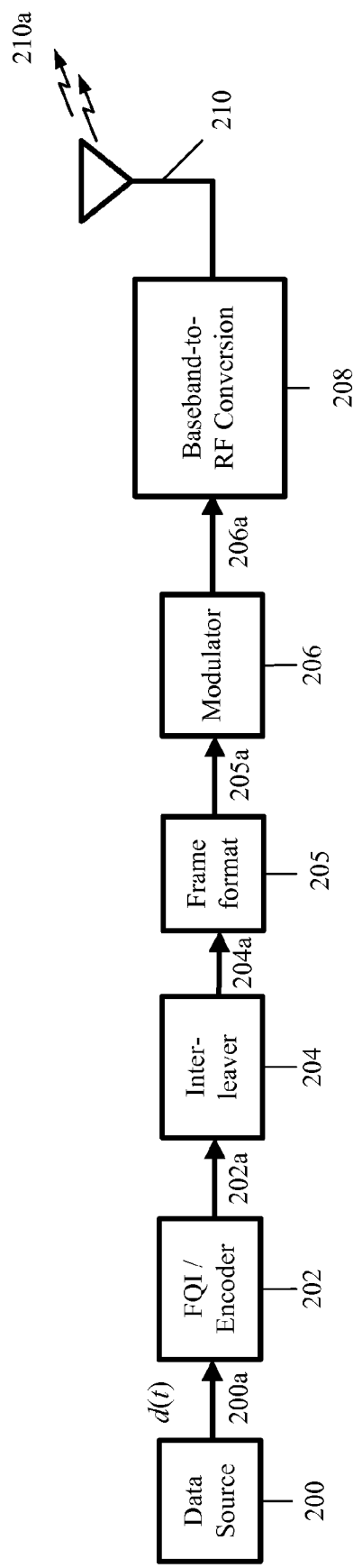
FIG. 5 is a functional block flow diagram of signals through structures of a transmitter.

FIG. 5 illustrates an example of a transmitter structure and/or process, which may be implemented, e.g., at user equipment 123-127. The functions and components shown in FIG. 5 may be implemented by software, hardware, or a combination of software and hardware. Other functions may be added to FIG. 5 in addition to or instead of the functions shown in FIG. 5.

In FIG. 5, a data source 200 provides data d(t) or 200*a* to an FQI/encoder 202. The FQI/encoder 202 may append a frame quality indicator (FQI) such as a cyclic redundancy check (CRC) to the data d(t). The FQI/encoder 202 may further encode the data and FQI using one or more coding schemes to provide encoded symbols 202*a*. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 204 interleaves the encoded data symbols 202*a* in time to combat fading, and generates symbols 204*a*. The interleaved symbols of signal 204*a* may be mapped by a frame format block 205 to a pre-defined frame format to produce a frame 205*a*. In an example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 204*a* are segmented into a plurality S of sub-segments making up a frame 205*a*.

A frame format may further specify the inclusion of, e.g., control symbols (not shown) along with the interleaved symbols 204*a*. Such control symbols may include, e.g., power control symbols, frame format information symbols, etc.

A modulator 206 modulates the frame 205*a* to generate modulated data 206*a*. Examples of modulation techniques include binary phase shift keying (BPSK) and quadrature phase shift keying (QPSK). The modulator 206 may also repeat a sequence of modulated data.

A baseband-to-radio-frequency (RF) conversion block 208 may convert the modulated signal 206*a* to RF signals for transmission via an antenna 210 as signal 210*a* over a wireless communication link to one or more Node B station receivers.

When adding multi-carrier functionality to W-CDMA, especially when multiple uplinks are involved, there is the question of how to initiate the multiple power control loops, and how to keep the calls monitored (i.e., radio link failure (RLF) monitoring). Additional carriers create a processing load on the UE downlink, interference on the uplink, and higher current consumption. Accordingly, techniques are disclosed herein for aggregating the important functions on "anchor carriers." Any of these anchor carriers may be sufficient to keep the call alive. The non-anchor carriers may still require additional processing to add and monitor them, but they are not crucial for the survival of the call. One advantage of the techniques disclosed herein is that they enhance the ability to get rid of some carriers when the survival functions are concentrated in one carrier or a subset of carriers.

According to various embodiments, the UE 123-127 described herein may be configured to perform various radio link control operations as described below and with reference to FIGS. 6-9.

Grouping of Physical Channels

According to various embodiments, the UE 123-127 operating in a multicarrier system is configured to aggregate certain functions of multiple carriers, such as control and feedback functions, on the same carrier, which may be referred to as an "anchor carrier." The remaining carriers that now depend on the anchor carrier for support are referred to as associated secondary carriers. For example, the UE 123-127 may aggregate control functions such as those provided by the optional dedicated channel (DCH), the nonscheduled grants, and a High Speed Dedicated Physical Control Channel (HS-DPCCH). The HS-DPCCH is an uplink code channel used for control purposes. It is not necessarily time aligned with the other W-CDMA uplink channels or continuously transmitted. As a result, it has a varying power relation to the dedicated uplink channels, the Dedicated Physical Control Channel (DPCCH) and the Dedicated Physical Data Channel (DPDCH). The DPDCH is the physical channel on the radio interface (Uu) on which payload (e.g., voice and IP data) as well as higher layer signaling (e.g., Non Access Stratum (NAS) signaling and Radio Resource Control (RRC)) are transmitted. Signaling and payload may be transmitted both on the downlink by the Node B 110, 111, 114 to the UE 123-127, and on the uplink by the UE 123-127 to the Node B 110, 111, 114.

In some embodiments, there may be multiple anchor carriers. In addition, non-anchor carriers may be added or removed without affecting the basic operation of the UE 123-127, including physical channel establishment and RLF procedures which are layer 2 procedures, such as in the 3GPP technical specification 25.331 for W-CDMA.

Figure 6:
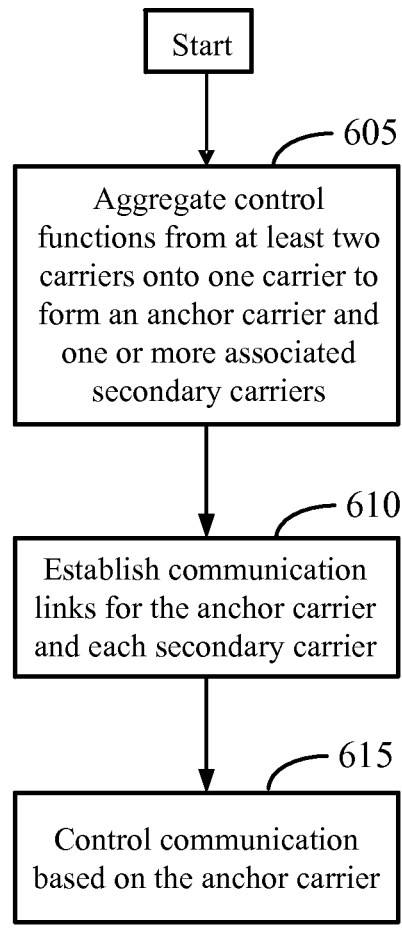
FIG. 6 illustrates a method for controlling radio links in a multiple carrier wireless communication system by grouping physical channels according to one embodiment.

FIG. 6 illustrates a method for controlling radio links in a multiple carrier wireless communication system by grouping physical channels according to one example. As shown, the method comprises: aggregating control functions from at least two carriers onto one carrier to form an anchor carrier and one or more associated secondary carriers (step 605); establishing communication links for the anchor carrier and each secondary carrier (step 610); and controlling communication based on the anchor carrier (step 615).

Physical Channel Establishment

The UTRAN may direct the UE 123-127 to transition between a number of RRC states. One such state is a Cell_DCH state. In the Cell_DCH state, a dedicated channel (DCH) is allocated to the UE 123-127 for the uplink and downlink. Transmission on multiple carrier uplinks may be started either in parallel or sequentially. The initial transmit power on the secondary carrier may be determined in an open loop manner or taken to be the same as the transmission on the anchor uplink plus a possible power margin for the initial transmit power.

Figure 7:
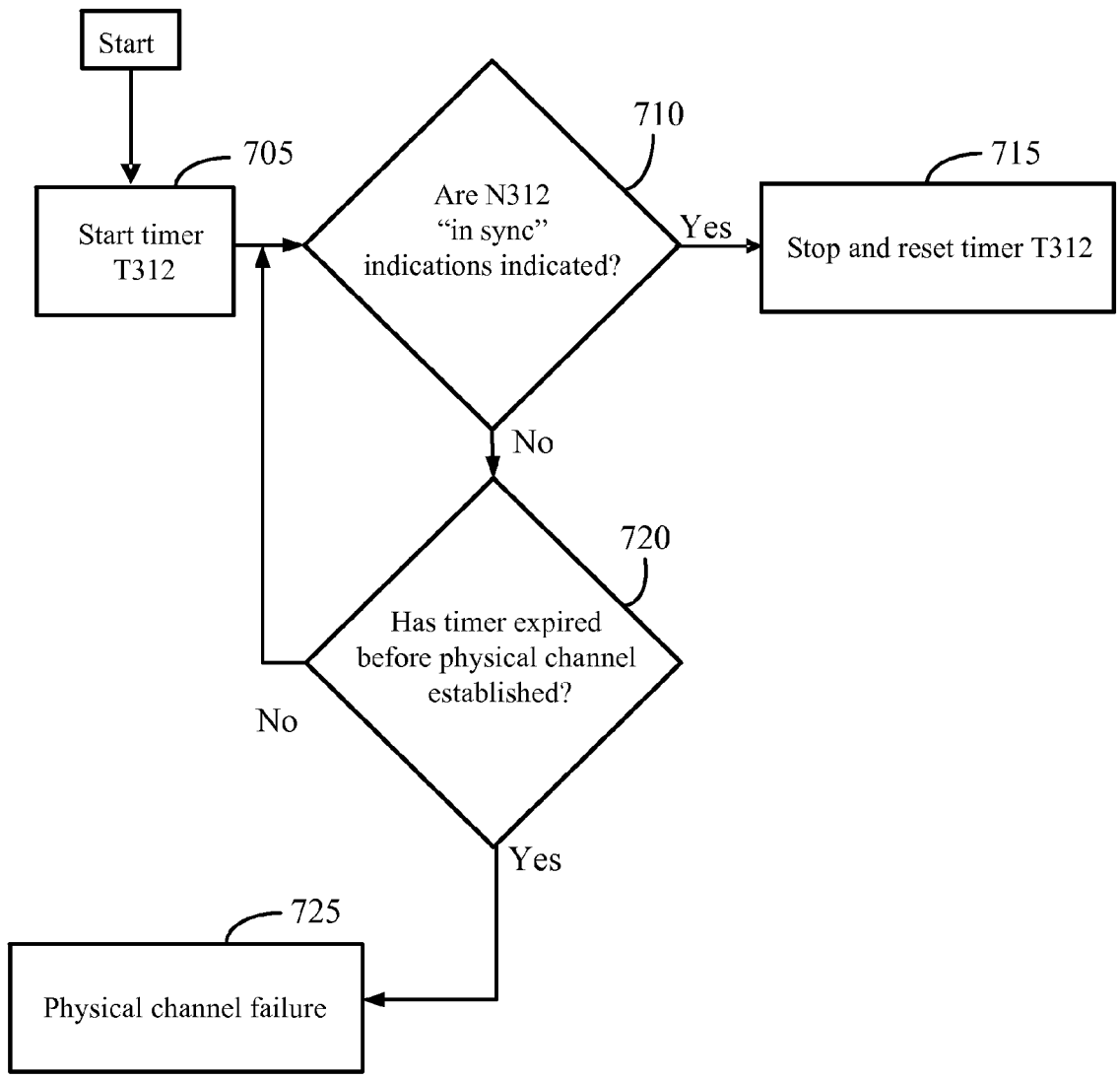
FIG. 7 is a flow diagram for establishing a dedicated physical channel using establishment criteria in the CELL_DCH state.

FIG. 7 is a flow diagram for establishing a dedicated physical channel using establishment criteria in the CELL_DCH state. The UE 123-127 initiates a physical dedicated channel establishment by starting a timer T312 (step 705) and waiting for layer 1 (i.e., the physical layer) to indicate a threshold number, N312, of "in sync" indications (step 710). The "in sync" indications may be derived from quality information (e.g., signal-to-noise ratio) of power control bits, for example. If the quality of the power control bits is above a given threshold for a given period of time, the channel may be determined to be "in sync," and an "in sync" indication sent. On receiving N312 "in sync" indications, the physical channel is considered established and the timer T312 is stopped and reset (step 715). If the timer T312 expires before the physical channel is established (step 720), the UE 123-127 may consider this as a "physical channel failure" (step 725).

In one example, the physical layer may send a first threshold number of "in sync" indications per carrier. The links on different carriers are established individually, such as by using the procedure described above with reference to FIG. 7. Once established, data may be sent on any of the established carrier links.

In another example, the physical layer again sends "in sync" indications for each carrier. However, the links are considered established only when all of the carriers satisfy the reception of a second threshold number, N, of "in sync" indications each. That is, data may not be sent if any of the carrier uplinks has not received N "in sync" indications.

In another example, the physical layer again sends "in sync" indications for each carrier. However, the links are considered established only when all of the carriers satisfy the reception of a third threshold number, M, of "in sync" indications in aggregate. That is, the total number of "in sync" indications received by all the carriers must equal M before data is sent.

In another example, the physical layer may send "in sync" indications for the anchor carrier only. The links are considered established when the anchor carrier is considered established as per the single carrier physical channel establishment described above.

In some examples, traffic on the uplink is not sent until the downlink communication links are established. Further, post-verification of the communication links may be employed in some examples, where the communication links are initially assumed to be established for data transmission, and only subsequently verified by checking pilot signal synchronization, etc. Accordingly, verification of a communication link may be performed after data is sent or received.

Power Control

Figure 8:
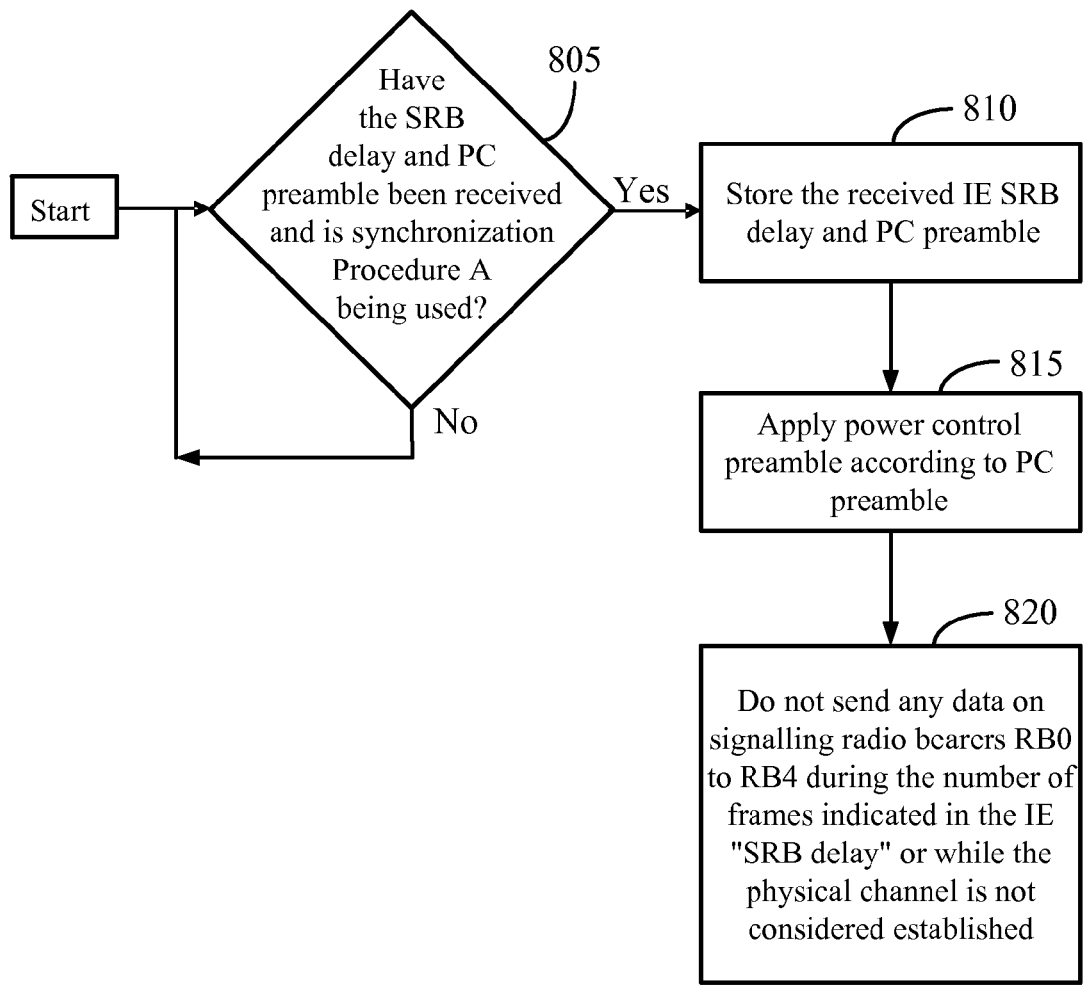
FIG. 8 illustrates an example power control procedure.

The signaling radio bearer represents the Radio Bearer (RB) available for usage by the RRC on the Common Control Channel (CCCH) and the Dedicated Control Channel (DCCH). Enhanced Dedicated Channels (E-DCHs) are high data rate uplink channels introduced in release 5 of UMTS. An E-DCH includes an enhanced control part (e.g., an E-DCH Dedicated Physical Control Channel (E-DPCCH)) and an enhanced data part (e.g., an E-DCH Dedicated Physical Data Channel (E-DPDCH)) in accordance with UMTS protocols. Two other control channels, E-DCH Uplink Control Channel (E-UCCH) and E-DCH Random Access Uplink Control Channel (E-RUCCH), may also be used to send signaling messages related to uplink enhancement. FIG. 8 illustrates an example power control procedure. When an Information Element (IE) "Signal Radio Bearer (SRB) delay" and an IE "PC preamble" are received in a message that results in a configuration of uplink Dedicated Physical Channel (DPCH) or the Enhanced Dedicated Physical Channel (E-DPCH), and a synchronization procedure A (step 805), the UE 123-127 stores the received IE "SRB delay" and IE "PC preamble" in the variable LATEST_CONFIGURED_SRB_DELAY_AND_PC_PREAMBLE (step 810). The UE 123-127 then applies the power control preamble during the number of frames indicated in the IE "PC preamble" (step 815). The UE 123-127 then does not send any data on signaling radio bearers RB0 to RB4 during the number of frames indicated in the IE "SRB delay" or while the physical channel is not considered established (step 820).

The procedure described above may be repeated on each carrier of a multiple carrier system either in parallel or sequentially. In parallel, the same procedure is applied on each carrier, for the same number of frames. In sequence, the procedure executed for the second carrier starts after the end of the first one (after either a new fixed value, or after the already existing "PC Preamble" parameter).

Radio Link Failure

Figure 9:
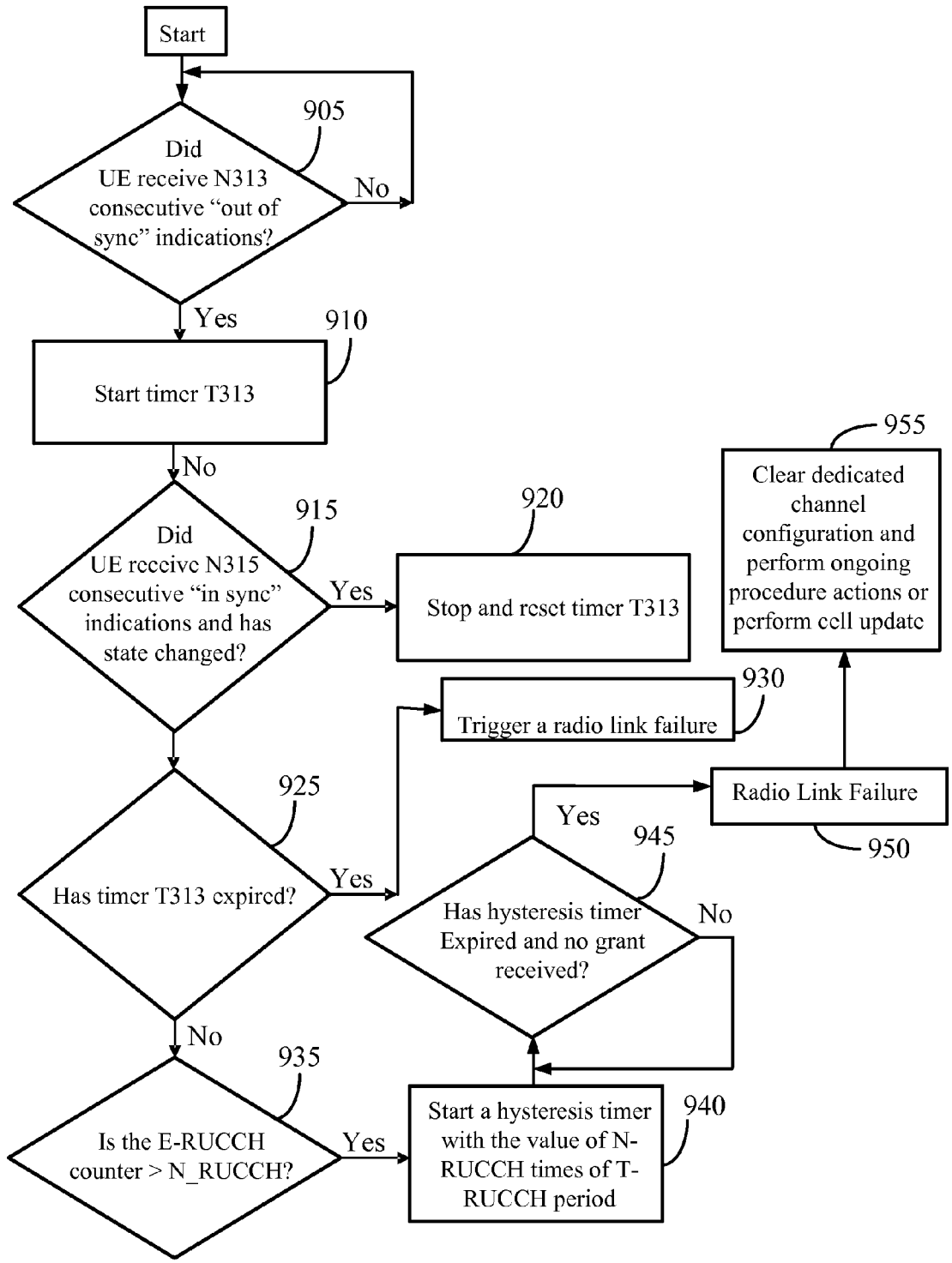
FIG. 9 illustrates a flow diagram for determining radio link failure (RLF) according to RLF criteria, and for responding to a radio link failure.

FIG. 9 illustrates a flow diagram for determining radio link failure (RLF) according to RLF criteria, and for responding to a radio link failure. In a CELL_DCH state, after receiving a first threshold number, N313, of consecutive "out of sync" indications from layer 1 (i.e., the physical layer) for the established DPCCH or F-DPCH physical channel in FDD, and the physical channels associated with mapped DCCHs in TDD (step 905), the UE 123-127 starts timer T313 (step 910).

Upon receiving a second threshold number, N315, of successive "in sync" indications from layer 1 and upon a change of UE state (step 915), the UE 123-127 stops and resets timer T313 (step 920). If T313 expires (step 925), then the UE 123-127 triggers a "Radio Link Failure" (step 930).

The periods in time where neither "in sync" nor "out of sync" is reported by layer 1 do not affect the evaluation of the number of consecutive (resp. successive) "in sync" or "out of sync" indications. For 1.28 Mcps TDD, when the variable E_DCH_TRANSMISSION is set to TRUE and the UE 123-127 has stored the IE "E-RUCCH info," a "Radio Link Failure" is triggered as described below.

If the E-RUCCH transmission counter exceeds a third threshold, N RUCCH (step 935), another hysteresis Timer with the value of N-RUCCH times of T-RUCCH period is started (step 940). When the hysteresis timer expires and still no Grant has been received for the whole time duration since the last E-RUCCH transmission (step 945), it is considered as a "Radio Link Failure" (step 950).

For FDD in CELL_DCH state and in TDD when a radio link failure occurs, the UE 123-127 clears the dedicated physical channel configuration, and performs actions as specified for the ongoing procedure. If no procedure is ongoing or no actions are specified for the ongoing procedure, the UE 123-127 may perform a cell update procedure using the cause "Radio Link Failure" (step 955).

Another RRC state is a Cell FACH state. The Cell FACH state does not use dedicated channels and is characterized by a forward access channel (FACH). This allows better power consumption at the expense of a lower uplink and downlink throughput. For FDD, in a CELL_FACH state and Idle mode, in conjunction with an Enhanced Uplink in the CELL_FACH state, after receiving an indication from layer 1 that physical layer transmission stopped caused by a DL out-of-synchronization, the UE 123-127 may consider it as a "Radio Link Failure."

In one embodiment, a radio link failure may be defined as described above with reference to FIG. 9 on an anchor carrier with a control feedback channel (like HS-DPCCH, which has a Channel Quality Indicator (CQI) and Acknowledgment (ACK) feedback channel). If the UE 123-127 fails on this carrier, the UE 123-127 may consider it a "Radio Link Failure" for the group of carriers dependent on the control and feedback carried by this carrier. If this is the only or last anchor carrier to be lost, the "Radio Link Failure" may be declared for the call.

In another embodiment, a radio link failure for multiple carriers may be modified so as to declare a "Radio Link Failure" only when all of the carriers satisfy an RLF failure condition. If the anchor carrier fails, the UE 123-127 may still maintain any associated secondary carriers while attempting to reestablish the anchor carrier. If the anchor carrier cannot be reestablished within a given period of time, the "Radio Link Failure" may ultimately be declared for the call.

Figure 10:
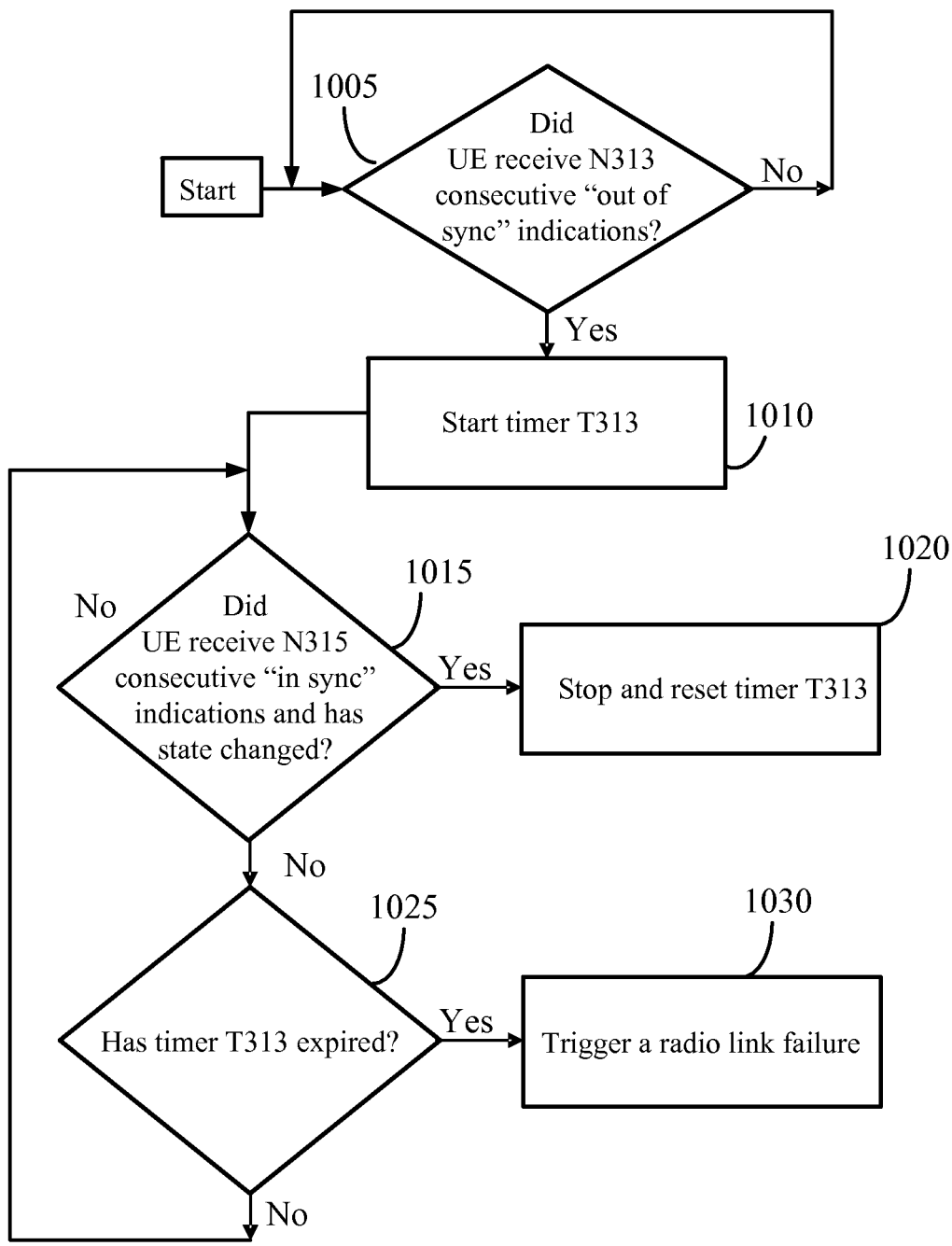
FIG. 10 illustrates an example modified radio link failure procedure for multiple carriers.

FIG. 10 illustrates an example modified radio link failure procedure for multiple carriers. In a CELL_DCH state, after receiving N313 consecutive "out of sync" indications from layer 1 (i.e., the physical layer) for the established DPCCH or F-DPCH physical channel in FDD, and the physical channels associated with mapped DCCHs in TDD (step 1005), the UE 123-127 starts timer T313 (step 1010). Upon receiving N315 successive "in sync" indications from layer 1 and upon change of UE state (step 1015), the UE 123-127 stops and resets timer T313 (step 1020). If T313 expires (step 1025), then the UE 123-127 considers it a "Radio Link Failure" (step 1030). The "out of sync" and "in sync" indications may be received for any of the anchor carriers, or from any of the non-anchor carriers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure and claims.

Various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described herein are in terms of sequences of actions to be performed by, for example, elements of a computing device included in the various elements disclosed here (e.g., RNC, MSC, Node B, UE, etc.). It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The previous description is provided to enable any person skilled in the art to make or use the disclosed methods and apparatuses. Various modifications to these methods and apparatuses will be readily apparent to those skilled in the art, and the generic principles defined herein may be applied to other examples without departing from the spirit or scope of the description or claims. Thus, the claims are not intended to be limited to the examples shown herein but are to be accorded the widest scope consistent with the principles and novel features disclosed herein.

Therefore, the disclosure is not to be limited except in accordance with the following claims.

What is claimed is:

1. A method for controlling radio links in a multiple carrier wireless communication system, the method comprising:
   aggregating, by a processor, control functions from at least two carriers onto one carrier to form an anchor carrier and one or more associated secondary carriers;
   establishing communication links for the anchor carrier and each secondary carrier according to at least one "in sync" indication comprising establishing a communication link for the anchor carrier before establishing any communication links for the secondary carriers, wherein the at least one "in sync" indication is derived based at least in part upon comparing one or more power control bits of each of the communication links for the anchor carrier and each secondary carrier with a threshold value within a period of time; and
   controlling communication based on the anchor carrier.

2. The method of claim 1, wherein establishing the communication links comprises:
   individually synchronizing each carrier with a physical channel by receiving a first threshold number of physical layer "in sync" indications for the carrier, each communication link being established when the first threshold number of "in sync" indications is received for the carrier.

3. The method of claim 2, further comprising:
   receiving data on any established carrier.

4. The method of claim 2, further comprising:
   receiving data on any established carrier only after a second threshold number of "in sync" indications is received for each of the carriers.

5. The method of claim 2, further comprising:
   receiving data on any established carrier only after a second threshold number of "in sync" indications is received for all the carriers in aggregate.

6. The method of claim 1, wherein establishing the communication links comprises:
   synchronizing the anchor carrier with a physical channel by receiving a first threshold number of physical layer "in sync" indications for the anchor carrier.

7. The method of claim 6, wherein one or more communication links of the secondary carriers is established when the first threshold number of "in sync" indications is received for the anchor carrier.

8. The method of claim 6, wherein all of the communication links are established when the first threshold number of "in sync" indications is received for the anchor carrier.

9. An apparatus for controlling radio links in a multiple carrier wireless communication system, the apparatus comprising:
   a processor; and
   memory in electronic communication with the processor programmed with instructions to:
      aggregate control functions from at least two carriers onto one carrier to form an anchor carrier and one or more associated secondary carriers;
      establish communication links for the anchor carrier and each secondary carrier according to at least one "in sync" indication comprising establishing a communication link for the anchor carrier before establishing any communication links for the secondary carriers, wherein the at least one "in sync" indication is derived based at least in part upon comparing one or more power control bits of each of the communication links for the anchor carrier and each secondary carrier with a threshold value within a period of time; and control communication based on the anchor carrier.

10. The apparatus of claim 9, wherein the instructions to establish the communication links comprises:

instructions to individually synchronize each carrier with a physical channel by receiving a first threshold number of physical layer "in sync" indications for the carrier, each communication link being established when the first threshold number of "in sync" indications is received for the carrier.

11. The apparatus of claim 10, further comprising:
instructions to receive data on any established carrier.

12. The apparatus of claim 9, wherein the instructions to establish the communication links comprises:

instructions to synchronize the anchor carrier with a physical channel by receiving a first threshold number of physical layer "in sync" indications for the anchor carrier.

13. The apparatus of claim 12, wherein one or more communication links of the secondary carriers is established when the first threshold number of "in sync" indications is received for the anchor carrier.

14. An apparatus for controlling radio links in a multiple carrier wireless communication system, the apparatus comprising:

means for aggregating control functions from at least two carriers onto one carrier to form an anchor carrier and one or more associated secondary carriers;

means for establishing communication links for the anchor carrier and each secondary carrier according to at least one "in sync" indication comprising means for establishing a communication link for the anchor carrier before establishing any communication links for the secondary carriers, wherein the at least one "in sync" indication is derived based at least in part upon comparing one or more power control bits of each of the communication links for the anchor carrier and each secondary carrier with a threshold value within a period of time; and means for controlling communication based on the anchor carrier.

15. The apparatus of claim 14, wherein the means for establishing the communication links comprises:

means for individually synchronizing each carrier with a physical channel by receiving a first threshold number of physical layer "in sync" indications for the carrier, each communication link being established when the first threshold number of "in sync" indications is received for the carrier.

16. The apparatus of claim 15, further comprising:
means for receiving data on any established carrier.

17. The apparatus of claim 14, wherein the means for establishing the communication links comprises:

means for synchronizing the anchor carrier with a physical channel by receiving a first threshold number of physical layer "in sync" indications for the anchor carrier.

18. The apparatus of claim 17, wherein one or more communication links of the secondary carriers is established when the first threshold number of "in sync" indications is received for the anchor carrier.

19. A computer program product for controlling radio links in a multiple carrier wireless communication system, comprising:

a non-transitory computer-readable storage medium comprising:

code for causing a computer to aggregate control functions from at least two carriers onto one carrier to form an anchor carrier and one or more associated secondary carriers;

code for causing the computer to establish communication links for the anchor carrier and each secondary carrier according to at least one "in sync" indication comprising establishing a communication link for the anchor carrier before establishing any communication links for the secondary carriers, wherein the at least one "in sync" indication is derived based at least in part upon comparing one or more power control bits of each of the communication links for the anchor carrier and each secondary carrier with a threshold value within a period of time; and code for causing the computer to control communication based on the anchor carrier.

20. The computer program product of claim 19, wherein the code for causing the computer to establish the communication links comprises:

code for individually synchronizing each carrier with a physical channel by receiving a first threshold number of physical layer "in sync" indications for the carrier, each communication link being established when the first threshold number of "in sync" indications is received for the carrier.

21. The computer program product of claim 19, further comprising:

code for causing the computer to receive data on any established carrier.

22. The computer program product of claim 19, wherein the code for causing the computer to establish the communication links comprises:

code for synchronizing the anchor carrier with a physical channel by receiving a first threshold number of physical layer "in sync" indications for the anchor carrier.

23. The computer program product of claim 22, wherein one or more communication links of the secondary carriers is established when the first threshold number of "in sync" indications is received for the anchor carrier.

* * * * *